Oct. 12, 1926.  
D. M. DEAN  
1,602,394  
MOLD FOR MAKING ARTICLES OF PLASTIC MATERIAL  
Filed May 19, 1922  2 Sheets-Sheet 1
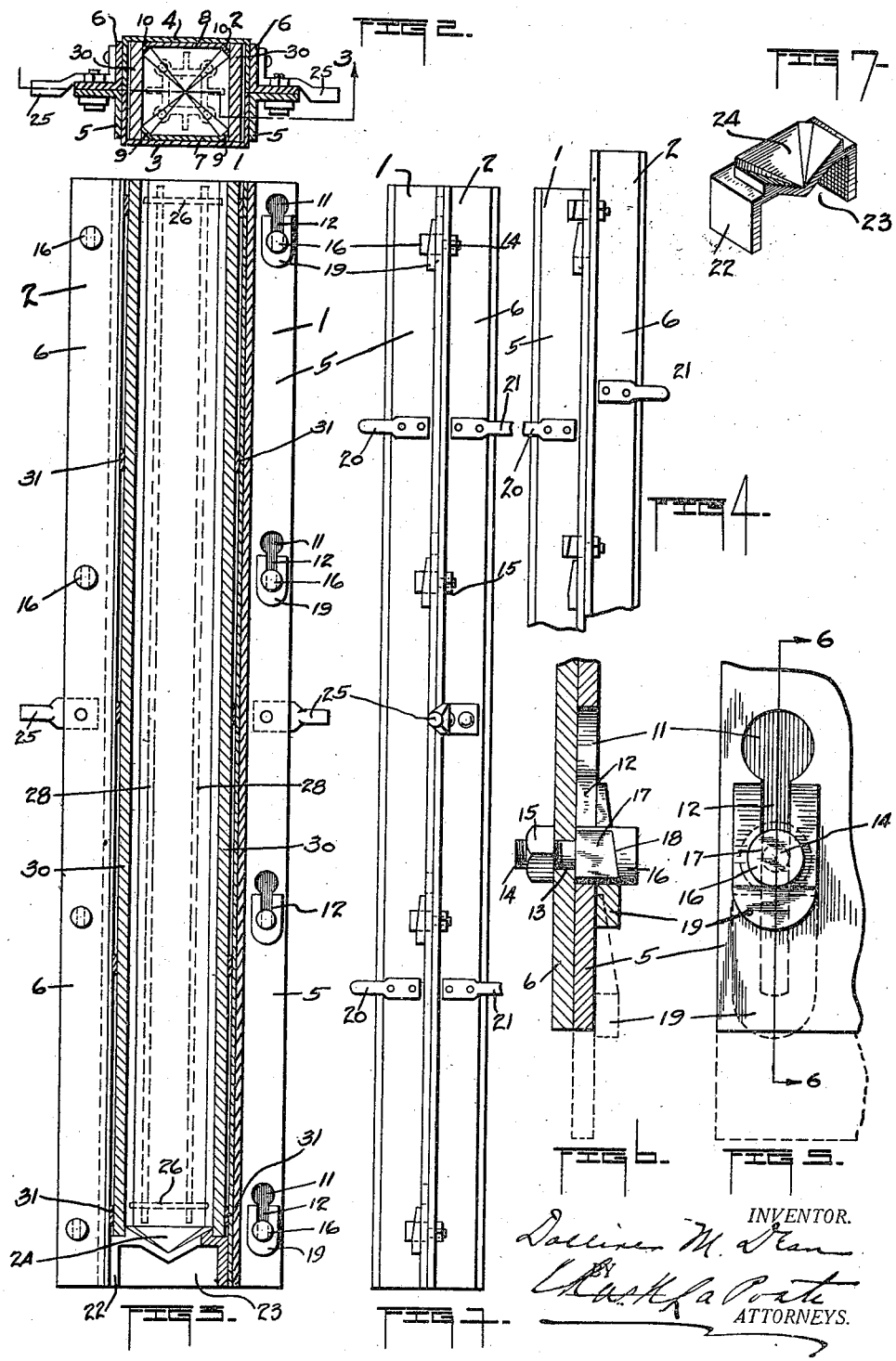

Oct. 12, 1926.
D. M. DEAN
1,602,394
MOLD FOR MAKING ARTICLES OF PLASTIC MATERIAL
Filed May 19, 1922    2 Sheets-Sheet 2
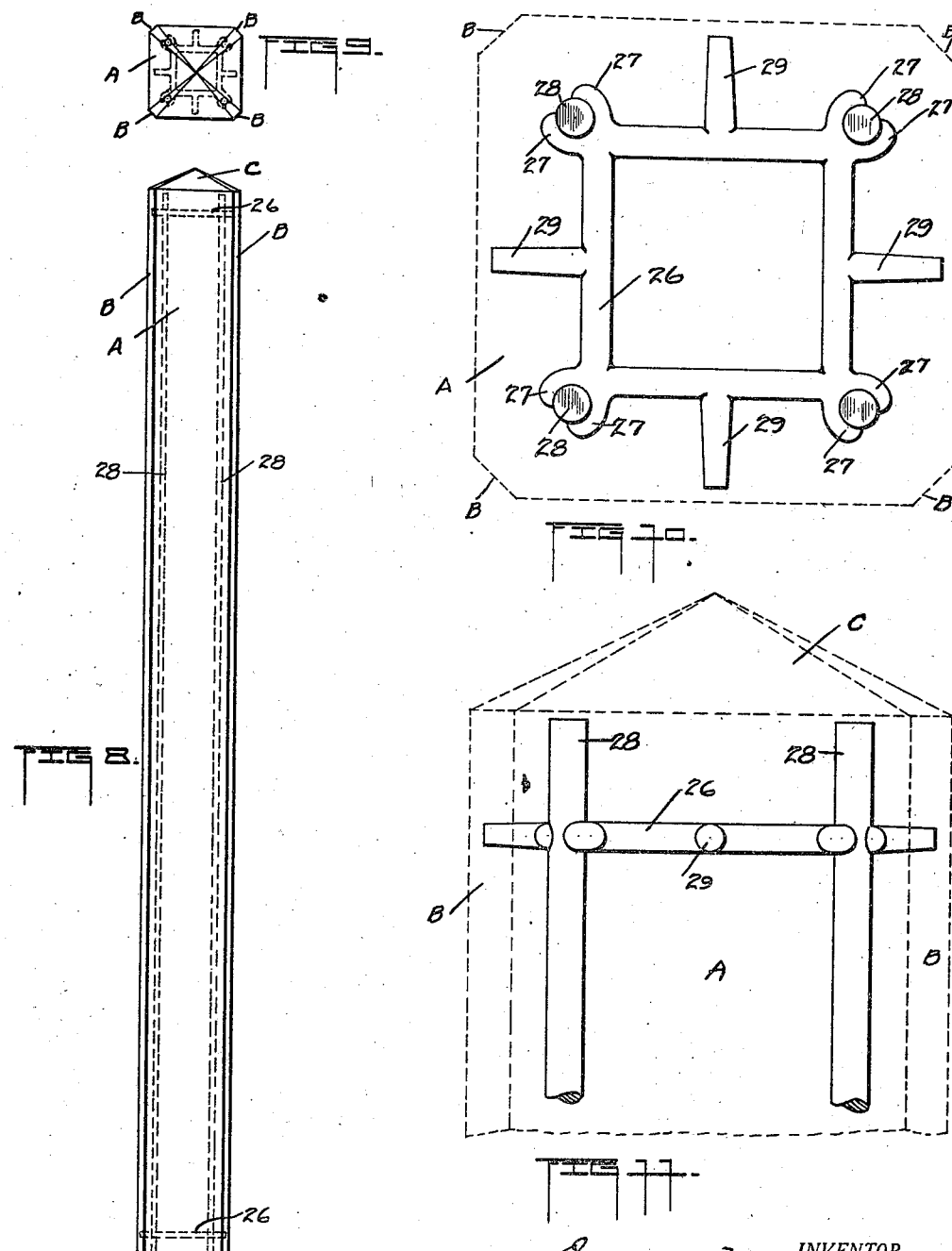
INVENTOR.
BY
ATTORNEYS.

Patented Oct. 12, 1926.

1,602,394

UNITED STATES PATENT OFFICE.

DOLLIVER M. DEAN, OF PEORIA, ILLINOIS, ASSIGNOR OF ONE-HALF TO MARK R. DEYO, OF PEORIA, ILLINOIS.

MOLD FOR MAKING ARTICLES OF PLASTIC MATERIAL.

Application filed May 19, 1922. Serial No. 562,162.

This invention has reference to improvements in molds for making or molding articles of plastic material, such as fence posts, posts for marking boundry lines and for other purposes; to the reinforcing means for such articles and the centering means therefor; to an improved locking means for removably locking the sections of the mold together; to character plates used in the mold for molding in the articles certain characters or markings, and to the resulting article molded in such a mold.

The invention has for a further object to provide a mold for the manufacture of posts and like articles from concrete or other plastic substances, which comprises separable sections slidable in relation to each other when joining or separating the said sections, and to complementary locking means on said sections for securing the sections of the mold together.

A further object of the invention is in the provision of reinforcing means for the articles, including means for centering the reinforcing means in the article during the tamping of the material in the mold.

A further object of the invention is to provide character plates or bars for the mold, adapted to contain suitable designating characters for molding into the article suitable designating markings.

A still further object of the invention is to mold a post preferably with beveled corners and with a plurality of reinforcing rods arranged preferably in rectangular form, said rods united top and bottom in reinforcing centering plates.

That the invention may be more fully understood, reference is had to the accompanying drawings forming a part of the description, illustrating a preferred embodiment of the invention, in which:—

Figure 1 is a side view of my improved mold, on a greatly reduced scale;

Figure 2 is a transverse sectional view through the mold with a post molded therein and reinforced with my improved reinforcing and centering means;

Figure 3 is a longitudinal sectional view through the mold, as the same would appear if taken on a line 3—3 Figure 2;

Figure 4 is a side elevation of a part of the mold shown in Figure 1, with the separable sections shown in the position they would occupy when separating or uniting the sections;

Figure 5 is a detail in plan of one set of complementary locking means;

Figure 6 is a cross-section as the same would appear on the line 6—6 Figure 5;

Figure 7 is a detail view of an end casting for the mold;

Figure 8 is an elevation of a molded post, the reinforcing and centering means shown therein, in dotted lines;

Figure 9 is an end view of the post shown in Figure 8;

Figure 10 is a detail in plan, approximately full size showing the reinforcing and centering means with the outline of the post in dotted lines, and Figure 11 is an elevation of the reinforcing and centering means shown in Figure 10 with an outline of the post in dotted lines.

Like characters of reference denote corresponding parts throughout the figures.

This application is a companion to one filed by me of even date herewith bearing Serial No. 562,161, which is directed to a method and apparatus for molding, reinforcing and tamping articles of concrete or other plastic substances, said companion application being an improvement upon the molding machine patented by me May 2, 1916, No. 1,181,214.

The mold preferably comprises separable sections 1 and 2 arranged to be brought into securing relation to each other and detached, by sliding one section on the other, in a manner to be more fully explained. Each section includes elongated U-shaped trough members 3 and 4 constituting half sections of a preferably tubular rectangular frame when the sections of the mold are in secured relation. To the outside of the side walls of each trough are secured elongated preferably angle-iron bars 5, 5 and 6, 6. To the inside of the face plates of each trough are secured plates 7 and 8, respectively, provided or formed with resilient angular ends 9 and 10, respectively, arranged when the sections of the mold are joined and plastic material is poured and tamped therein to produce or mold beveled corners the length of the post A, as at B, see Figures 8 to 11, inclusive. At suitable points in the length of the angle iron bars 5, 5 are provided bolt openings 11 in communication with elongated slots 12. At suitable points in the length of the angle iron bars 6, 6, are provided bolt openings 13 and through such openings are carried bolts 14 secured in place by nuts 15. Each bolt 14 is formed or provided with an enlarged lug shaped head 16 provided with opposite flat sides 17 and an inclined or tapered shoulder 18. Said lug shaped heads 16 are of the same diameter as the bolt openings 11 in the angle iron bars 5 and the thickness of said heads between their flat faces 17 is of the same width as the slots 12; whereby it will be seen that, when the angle iron bars 5 of section 1 are laid on the angle iron bars 6 of the section 2 with the bolt openings 11 coincident with the bolts 14 the heads 16 of the latter may be inserted through the bolt openings 11; then by sliding the section 1 on the section 2, permitted by the flat faces 17 of the heads 16 sliding between the walls of the slots 12, the parts are ready for locking. The locking elements include the tapered or inclined shoulders 18 on the heads 16 and the tapered bifurcated wedge members 19 secured to the angle iron bars 5 and adapted to slide on either side of the flat faces 17 of the heads 16 and under and against the tapered or inclined shoulders 18 on the heads 16. In this manner the sections 1 and 2 are locked together, while reverse movement of the section 1 on the section 2 to bring the bolts 14 coincident with the bolt openings will permit the sections to be separated by lifting one off the other, as it is believed will be understood. The sections have hand holds 20 and 21 respectively, by means of which the sections may be handled.

One end of the mold is left open when the sections are joined, to receive the concrete or other plastic substance to be poured therein; whereas the other end is closed by the casting 22 made in half sections, one each connected with the corresponding ends of the sections 1 and 2 respectively. Said casting is provided with a socket 23 to receive a member on the tamping machine, not shown, by which the mold is held in position as the same is lifted and allowed to drop to abruptly jog or tamper the material in the mold. The inner end of the casting 22 is formed or provided with a tapered depression 24 which forms a corresponding tapered end C on the top of the post A. The casting end 22 of the mold during molding being considered as the lower end of the mold.

To the opposite sides of the section 2 of the mold and about midway the length thereof are secured trunnions or similar members 25 serving as a mounting for the mold on the tamping machine to steady and guide the mold during movement thereof in and up and down direction for tamping the material in the mold.

In operation, assuming that the sections 1 and 2 have been joined and locked together, the mold is supported in a perpendicular position by means of the trunnions 25 on the tamping machine with the socket 23 of the casting 22 on the lower end of the mold embracing a member on the tamping machine, to center the mold and guide it during up and down movement to tamp the material being poured into the open end of the mold. A small amount of material is first poured into the mold, sufficient to fill the tapered end 24 of the casting 22. The attendant then drops into the mold the reinforcing means which comprises the preferably rectangular skeleton plates 26, the corners of which have jaws 27 to grip rods 28 which extend almost the full length of the mold, and therefore the post to be molded, with the plates 26 at or near each end of the mold and likewise the post to be molded. Said plates 26 are each provided with oppositely, laterally extended centering pins or lugs 29, which, as the mold is jogged up and down by the tamper and vibrating against the sides of the mold automatically center themselves in the mold and likewise the post being poured and molded, and the post becomes molded with the plates 26 centered in the post and the rods 28 equidistant from the sides and corners of the post. Such reinforcing, as I have described is of an unusual character and produces a post of unusual strength.

The mold as described omits the character plates or bars to which reference has been made, as it should be apparent that the mold may or may not require the molding of posts with markings molded therein. This is a manufacturer's expedient, and is only found desirable in some instances, such for instance in the holding of posts employed for county and State lines, or similar corner posts, and sometimes in railroad use.

The character plates or boards are each designated 30, and although not shown with engravings or embossings thereon, it is understood the inner faces of said plates or boards, at one end or the other or at any point thereon may be and are to be provided with suitable markings, which in turn are to be molded or imprinted in the face or faces of the molded post. As shown, the plates or bars 30 are separate from each other and from the sections 1 and 2 and clamped within and between the said sections when they are joined, and preferably at the opposite ends of the plates 7 and 8, respectively. The resilient ends 9 and 10 of the respective plates 7 and 8 are intended to have an impinging relation with the plates or bars 30 so that a very tight fit shall be made at this point and thereby prevent uneven or rough edges of the bevel edges of the post. Spacing members 31 are provided on the plates or bars 30 to bear against the walls of the sections 1 and 2, and to enable easy removal of the sections 1 and 2 when unfastened without tearing off the plates or bars 30, which might result in defacing the markings on the post.

What I claim is:—

1. A mold for articles of plastic substances, comprising separable sections arranged to have a slidable relation longitudinally of each other preliminary to fastening and separating said sections, complementary locking members on said sections, and character plates for said mold to mold suitable markings in said articles.

2. A mold for articles of plastic substances, comprising separable sections arranged to have a slidable relation longitudinally of each other preliminary to fastening and separating said sections, complementary locking members on said sections, and an end casting of separable sections to mold tapered ends on said articles.

3. A mold for articles of plastic substances, comprising separable sections arranged to have a slidable relation longitudinally of each other preliminary to fastening and separating said sections, complementary locking members on said sections, character plates for said mold to mold suitable markings in said articles, and an end casting of separable sections to mold tapered ends on said articles.

4. A mold for articles of plastic substances, comprising separable sections arranged to have a slidable relation longitudinally of each other preliminary to fastening and separating said sections, complementary locking members on said sections, plates in the mold having angular ends for molding articles with beveled corners, and means in the mold for molding tapered ends on said articles.

5. A mold for articles of plastic substances, comprising separable sections arranged to have a slidable relation longitudinally of each other preliminary to fastening and separating said sections, complementary locking members on said sections, character plates for said mold to mold suitable markings in said articles, plates in the mold having angular ends for molding articles with beveled corners, and means in the mold for molding tapered ends on said articles.

6. A mold for articles of plastic substances, comprising separable sections arranged to have a slidable relation preliminary to fastening and separating said sections, complementary locking means on said sections, hand gripping means connected to each section, and supporting means connected with one of said sections.

7. A mold for articles of plastic substances, comprising separable sections arranged to have a slidable relation preliminary to fastening and separating said sections, said sections provided with plates adapted to lie in juxtaposition, certain of said plates having bolt openings and communicating elongated slots, wedge members connected to said last mentioned plates and straddling said slots, and bolts connected with the other of said plates and having wedging surfaces to be engaged by said wedge members.

In witness whereof, I have hereunto affixed my hand this 12th day of May, 1922.

DOLLIVER M. DEAN.